UNITED STATES PATENT OFFICE.

FREDK. VON EGLOFFSTEIN, OF NEW YORK, N. Y.

HELIOGRAPHIC AND PHOTOGRAPHIC SPECTRUM FOR PRODUCING LINE-ENGRAVINGS.

Specification forming part of Letters Patent No. 51,103, dated November 21, 1865; antedated November 5, 1865.

*To all whom it may concern:*

Be it known that I, FREDERICK VON EGLOFFSTEIN, of the city, county, and State of New York, have invented certain new and useful Improvements in Heliographic and Photographic Spectrums for Producing Line-Engravings from transparent photographs on glass or paper taken from life and external objects by contact exposition, and by the camera obscura; and I do hereby delare that the following is a full, clear, and concise description thereof, sufficient to enable any one skilled in the art to make and use the same.

My invention consists in a heliographic and photographic spectrum for producing line-engravings from transparent photographs prepared in any of the usual known ways.

The spectrum may be composed of a single sheet of highly-polished level ground plate-glass, free from colors, and covered with a good asphaltum etching-ground, heated and smoked over a wax taper, in the manner of the engraver's black etching-ground. The plate, when cooled off, is ruled over by the diamond or other point of a correct ruling-machine, using light pressure to prevent the chipping off of the ground and the flaking or breaking of the glass.

Upon the insertion of an edge, guide, or pattern, varying in profile from the mathematical line or straight edge of the ruling-machine, and guiding the course of the diamond or other point, it will be obvious that any system of lines, grooves, or gratings from the straight line to the semicircle, with equal or varying intervals, can be traced with facility, and preserving the perfect parallelism required for the different spectra. Almost every style of line or figure used in line-engraving may thus be obtained—vertical, horizontal, inclined, waved, barred, or dotted—and the figures between the lines may be of the same or varied characters, and of such degree of fineness or otherwise as the character of the work or the fancy of the user may require.

I have mentioned that the spectrum may be composed of a single plate of glass. This single plate is sufficient to receive the lines and figures of the spectrum; but I usually lay another plate of glass over its prepared and lined and figured side to preserve it from damage. I do not, however, confine my invention to a single plate, as multiple plates may be used.

The plate prepared to receive the engraving is coated first with a sensitive heliographic varnish. Upon this varnish the spectral image is produced by the light falling through the open spaces of the spectrum, made as above set forth. The spectrum is thus imprinted upon the varnish previous to its receiving the photographic image by means of a second exposure to the light. Both images are thus blended into one, the spectrum giving texture to the photographic image. Then may follow the ordinary heliographic manipulations of developing the picture. The photographic image being the last, and for a longer period exposed, overpowers the spectral image, but only so far as to preserve the delicate half-tints, the spectrum remaining sufficiently strong to serve as a means for holding the printer's ink when impressions are to be taken from the plate.

Having thus fully described the nature, object, and purpose of my invention, what I claim therein as new is—

The use of a spectrum for the purpose of producing line-engravings from transparent photographs, substantially as herein described.

FREDERICK VON EGLOFFSTEIN.

Witnesses:
A. B. STOUGHTON,
EDM. F. BROWN.